Feb. 10, 1959     K. B. COFER     2,873,298
PRODUCTION OF GLYCERINE
Filed April 5, 1957
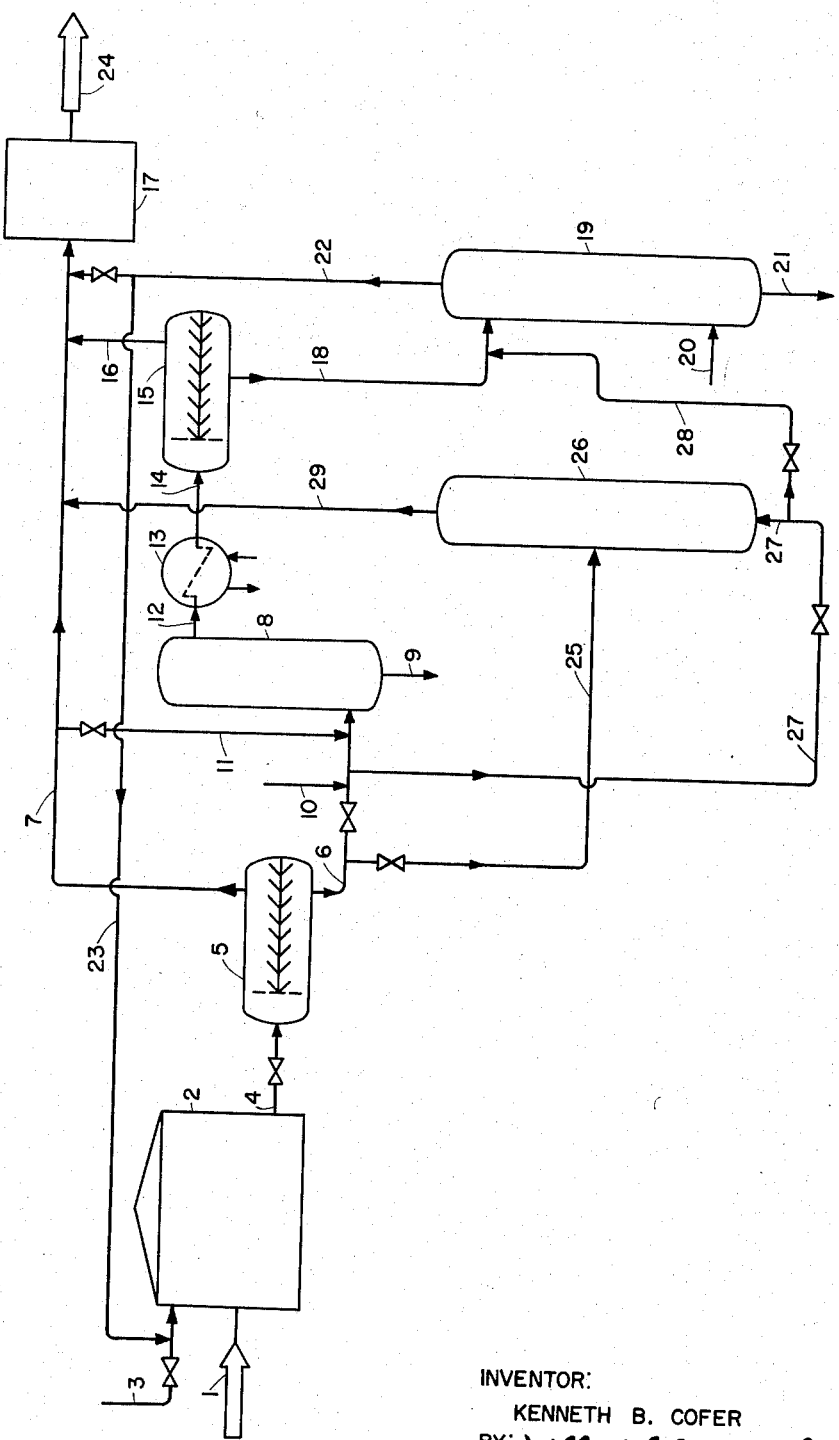
INVENTOR:
KENNETH B. COFER
BY: *Millard L. Caldwell*
HIS ATTORNEY United States Patent Office 2,873,298
Patented Feb. 10, 1959

2,873,298

PRODUCTION OF GLYCERINE

Kenneth B. Cofer, Pasadena, Tex., assignor to Shell Development Company, New York, N. Y., a corporation of Delaware Application April 5, 1957, Serial No. 651,038

6 Claims. (Cl. 260—636)

This invention relates to the production of synthetic glycerine and deals with an improvement in the production of glycerine from chlorohydrins whereby glycerine of superior quality can be obtained.

Synthetic glycerine made from allyl chloride has been produced on a very large scale for a number of years and now accounts for more than 25% of all the glycerine sold in this country. The quality of this glycerine is of a very high order, most of it meeting all the requirements of USP specifications except the test for readily carbonizable substances (RCS test, United States Pharmacopoeia XV, pages 309, 911). This test was established to detect adulteration with sucrose and has no practical significance for present day uses of synthetic glycerine. However, failure to pass the test has made it impossible to apply the USP label to synthetic glycerine even when it has been substantially purer than saponification glycerine which meets USP specifications. This has interfered with sales to about one-third of the United States glycerine market.

An important object of the present invention is the provision of a process for producing USP glycerine from glycerine chlorohydrins, i. e. mono- or di- chlorohydrins or epichlorohydrin or mixtures thereof. Another object is the production of glycerine of improved quality with respect to RCS test, color and other properties by hydrolysis of glycerine chlorohydrins. More particularly it is an object of the invention to provide a method whereby the quality of chlorohydrin hydrolysis products can be improved without substantial loss of glycerine yield in the process. The nature of other objects and advantages of the invention will be apparent from the description of the new process which follows.

The chemical nature of the component or components of synthetic glycerine as heretofore produced which are responsible for its failure to meet USP specifications is not fully known. They are compounds which cannot be eliminated in the rigorous purification treatments to which this glycerine is subjected in the ordinary course of manufacture. However, it has been found that by proper treatment of the chlorohydrin or chlorohydrins from which the glycerine is produced to remove minor amounts of higher boiling components before hydrolysis of the chlorohydrin to glycerine, one can obtain glycerine which not only meets all the requirements for USP glycerine but also has a better color and purity than is required by even these exacting specifications. These undesirable components of the chlorohydrin feed to the hydrolyzer are so like the chlorohydrins in boiling range and solubility characteristics that they cannot be separated therefrom by ordinary distillation or extraction methods without removal therewith of substantial amounts of chlorohydrin which results in a corresponding loss in glycerine yield. In accordance with the invention these difficulties are overcome and high purity USP glycerine is produced with minimum loss by a combination process comprising treating glycerine chlorohydrin to separate a minor proportion of the chlorohydrin together with higher boiling components and subsequently extracting chlorohydrin from other components of the separated mixture.

For the sake of clarity, the invention will first be described in one of its more advantageous modifications as applied to the production of USP glycerine from mixtures of epichlorohydrin and dichlorohydrin isomers such as are obtained as intermediates in the process of U. S. Patent 2,605,293. It will be understood, however, that this application of the invention has been chosen for purposes of illustration only and that not only can similar mixtures having the same or other proportions of epichlorohydrins and dichlorohydrins from other sources be used in the same way but also epichlorohydrin only or its mixtures with monochlorohydrins with or without dichlorohydrins can be employed successfully as the starting material.

Surprisingly it has been discovered that the water-insoluble by-product, trichloropropane and/or tetrachloropropyl ether, which are formed in small amounts in the production of dichlorohydrins from allyl chloride are effective solvents for the RCS precursors in chlorohydrins. These compounds are not themselves RCS precursors and, in fact, can be hydrolyzed to glycerine, although with more difficulty than is the case with the chlorohydrins. They are therefore not undesirable components of the feed to the hydrolyzer in the manufacture of glycerine. One or both of these compounds from an outside source or the mixture thereof present in the chlorohydrin feed can be used to extract the crude chlorohydrins and obtain chlorohydrins which on hydrolysis give glycerine readily recoverable as USP grade product.

An especially advantageous method of carrying out the extraction of the RCS precursors by means of the by-product trichloropropane and tetrachloropropyl ether present in the chlorohydrin feed, comprises dilution of the feed with sufficient water to cause separation of these components of low water solubility. A more dilute aqueous chlorohydrin solution can conveniently be used for this dilution. Whether such a solution or water alone is used for the dilution, an organic by-product phase separates from an aqueous phase containing the major portion of the chlorohydrins. On settling the mixture stratifies into an organic by-product lower layer in which the RCS precursors are preferentially soluble and an upper layer of aqueous chlorohydrin solution substantially freed of RCS precursors. These layers are readily separated, for instance by decantation. However, as previously indicated, substantial amounts of chlorohydrin are separated along with the RCS precursors. Often epichlorohydrin and dichlorohydrin representing 10 to 20% of the total glycerine production is extracted as well. These glycerine intermediates can be recovered from the extracted RCS precursors in different ways but water extraction of mono- and/or dichlorohydrins as the final step in removal of these precursors has been found to be essential in all cases.

The limited water solubility of epichlorohydrin (7.4% by weight at 50° C.) makes it desirable to hydrate the epichlorohydrin, when present in the separated mixture of chlorohydrin and RCS precursors, before carrying out the extraction with water. When the epichlorohydrin is converted to monochlorohydrin in this way, all the chlorohydrins in the mixture can then be extracted efficiently from the other components with a minimum amount of water. The extracted chlorohydrins are then added to the purified chlorohydrins obtained in the first step of the process and constituting the major part of the starting chlorohydrins. The mixture is then hydrolyzed in the usual way to obtain glycerine which can be recovered as USP product in a simple manner.

The attached drawing is a flow sheet in which the foregoing modification of the invention is illustrated. The apparatus illustrated is shown diagrammatically and not to scale and auxiliary equipment including the necessary pumps, etc. have been omitted in the interest of clarity.

In the drawing, 1, indicates a supply line by which chlorohydrin, in the present example crude aqueous epichlorohydrin from the chlorohydrination of allyl chloride and dehydrochlorination of the resulting dichlorohydrin, is fed to dilution tank 2. Besides epichlorohydrin and water this stream will contain minor amounts of trichloropropane and tetrachloropropyl ether as well as RCS precursors as previously discussed. Tank 2 is advantageously provided with mixing means, not shown, such for instance as a power driven paddle or a circulating pump or the like, whereby uniform mixing of the contents is insured. Line 3 is a feed line for water or other suitable aqueous dilution medium, preferably a portion of the aqueous dichlorohydrin solution from which the epichlorohydrin solution was prepared. The relative rates of feed of chlorohydrin by line 1 and aqueous dilution medium by line 3 are controlled so that the mixture separates into an aqueous phase containing the major part of the chlorohydrins present and an organic phase containing the major part of the trichloropropane, tetrachloropropyl ether and the RCS precursors together with a minor part of the chlorohydrins present in the mixture. The amount of water which it will be desirable to add for this purpose will vary somewhat with the composition of the mixture being treated but satisfactory separation of an organic by-product phase containing the RCS precursors which it is necessary to remove in order to produce glycerine of the required purity can usually be obtained by adjusting the water content so that the concentration of chlorohydrins in the total mixture is between about 5% and about 15%, more preferably between about 7% and about 10% by weight. Too little dilution results in incomplete separation of the trichloropropane and the like and consequent inadequate removal of RCS precursors. Excessive dilution on the other hand is also undesirable because it reduces the solubility of the RCS precursors in the separated organic by-product phase. The resulting two-phase liquid mixture is withdrawn continuously by line 4 to a separator 5 in which the more dense organic phase is allowed to settle as a lower layer which is removed by line 6 while the upper layer of aqueous chlorohydrin solution is removed by line 7.

The organic by-product phase is conducted by line 6 to hydration vessel 8 in which the epichlorohydrin therein is reacted with water to convert it to the more soluble monochlorohydrin. One suitable method of conducting this hydration is by feeding in steam by line 9 to heat the mixture after dilution with water supplied by line 10 or more preferably aqueous chlorohydrin solution fed in by line 11 or taken off together with the lower layer by line 6. Heating at a temperature of about 200° to about 400° F. under sufficient pressure to maintain the mixture substantially in the liquid phase for about 2 to 30 minutes, using shorter times the higher the temperature, is usually sufficient to produce adequate hydration of the epichlorohydrin when using for dilution about 5 to 15 volumes of water per volume of organic by-product phase undergoing treatment. Other methods of hydration can of course be used, however. For instance, acid or base can be added in small amounts to accelerate the reaction. Such catalysts are advantageously used in the form of acidic or basic ion exchange resin beds through which the mixture is flowed at a suitable temperature or in some other form which avoids contamination of the mixture during hydration. Most preferably non-catalytic thermal hydration is employed.

After hydration of the epichlorohydrin in the lower layer in vessel 8, the reacted mixture is passed by line 12 to a cooler 13 in which the temperature of the mixture is preferably reduced to below 200° F. and most preferably to about 150° F. or lower. Such cooling is desirable in order to insure maximum rejection of RCS precursors from the aqueous phase of the mixture, but can be omitted in some cases and will, of course be unnecessary when using a catalytic hydration method conducted at a sufficiently low temperature. Whichever of these methods of operation is chosen, the reacted hydration mixture is passed by line 14 to a second phase separator, 15, in which the mixture is allowed to separate into an upper layer of aqueous chlorohydrin solution substantially freed of RCS precursors and a lower organic layer of the by-product trichloropropane and tetrachloropropyl ether containing RCS precursors and a substantial amount of chlorohydrins. The aqueous solution of mono- and dichlorohydrins is taken off by line 16 connecting with line 7 in which it is admixed with the chlorohydrin solution from separator 5 and conducted to hydrolysis and recovery unit 17. The hydrolysis of the chlorohydrins to glycerine in unit 17 can be carried out in any suitable manner. An especially advantageous method of carrying out this hydrolysis and simultaneous hydration of the epichlorohydrin content of the mixture using an aqueous inorganic carbonate as the hydrolyzing agent is described and claimed in copending application of Kenneth B. Cofer, Serial No. 424,160, filed April 19, 1954 now U. S. Patent No. 2,810,768. Van de Griendt patent—U. S. 2,318,032 describes and claims another method of hydrolysis which can be used. Still other hydrolysis procedures can also be employed. In any case, due to the efficient removal of RCS precursors from the chlorohydrins, the glycerine produced will be of a purity such that it can be readily recovered by conventional methods as USP glycerine.

The lower layer of separator 15 which still contains valuable chlorohydrins is withdrawn by line 18 and passed to extractor 19 in which the chlorohydrin (mono- and dichlorohydrins) is extracted with water supplied by line 20. The proportion of chlorohydrin to trichloropropane, tetrachloropropyl ether and RCS precursors in the feed to extractor 18 is lower than was the case in the previous separations of these components in separators 5 and 15 and it is feasible to extract substantially all of the chlorohydrin from the mixture with only minor contamination of the extract with RCS precursors. The extraction is preferably carried out at a temperature of about 70° to about 150° F. using about 8 to about 10 volumes of water per volume of lower layer supplied by line 18. While any conventional type of extraction apparatus can be successfully employed, especially good results have been obtained with a rotary disc contactor of the type described and claimed in Remon patent—U. S. 2,601,674. The extracted organic phase consisting principally of trichloropropane and tetrachloropropyl ether containing the rejected RCS components is removed from the system by line 21 while the extracted chlorohydrins are withdrawn by line 22. Although the thus recovered chlorohydrins will usually not be sufficiently free from RCS precursors to permit their conversion alone to USP glycerine they can generally be added safely to the previously separated chlorohydrins in line 7 and converted to glycerine therewith in unit 17 since their RCS precursor content is so small the final glycerine will easily meet all the requirements for a USP product. However, for production of glycerine of maximum purity the extract withdrawn by line 22 can be returned by lines 23 and 3 to dilution tank 2 where it will serve to supply a part or all of the dilution water making it unnecessary in the latter case to introduce additional chlorohydrin solution by line 3. The RCS precursors thus returned to the system will be rejected in the organic mixture withdrawn by line 21 and will not appear in the feed to hydrolysis and recovery unit 17 from which glycerine of greater purity and better color than is required by USP specifications is withdrawn by line 24.

While the foregoing method is superior in all respects to other ways of carrying out the process of the invention, there are certain other modifications of the invention illustrated in the drawing which can be used to make USP glycerine at some sacrifice of quality of product and/or economy of operation. Thus, for example, the organic lower layer from separator 5 composed primarily of trichloropropane and tetrachloropropyl ether in which are dissolved the chlorohydrins, epichlorohydrin, dichlorohydrin and monochlorohydrin, together with the RCS precursors extracted therewith from the aqueous phase removed by line 7, can be fed by line 25 to a fractionating column 26 instead of to the hydrator 8. In column 26 the mixture is distilled so as to separate substantially all, preferably at least about 95%, of the epichlorohydrin overhead together with a part of the dichlorohydrins content. The bottoms stream from the column, taken off by line 27 contains the remainder of the dichlorohydrins, the monochlorohydrin, higher boiling by-products (trichloropropane and tetrachloropropyl ether) and the major portion, usually about 90% or more, of the RCS precursors. This bottoms stream is conducted by line 28 to line 18 and fed to extractor 19 in which the mixture is extracted with water to remove the mono- and dichlorohydrins from the other components as previously described. Because the removal of RCS precursors in column 26 may be less complete than when using the previously described epichlorohydrin hydration method, it will usually be desirable to return the extract by lines 22 and 23 for admixture with the feed to the process rather than add it to the aqueous layer from separator 5 although this is also feasible in come cases. The overhead product from column 26, however, is fed by line 29 to line 7 where it passes with the chlorohydrins of the aqueous upper layer to hydrolysis and recovery unit 17 in which USP glycerine is produced as before.

The following examples further illustrate the new process of the invention in certain of its embodiments which, however, are non-limitive.

*Example I*

An aqueous solution of allyl chloride chlorohydrination product containing 5.4% of chlorohydrins, 0.8% trichloropropane and tetrachloropropyl ether, 1.9% sodium chloride and the remainder essentially water with trace amounts of organic impurities, was divided into two streams one of which, representing about 85% of the total, was fed to a stripping column with a small molar excess of sodium hydroxide solution based on the dichlorohydrin content of the stream. The overhead product of stripping at about 210° F. to 220° F. was aqueous epichlorohydrin containing 21.3% epichlorohydrin with 2.7% of trichloropropane, tetrachloropropyl ether and higher boiling impurities which on dilution with the remaining 15% of the starting chlorohydrins solution and an aqueous solution containing 3.3% of mono- and dichlorohydrins and 0.1% epichlorohydrin obtained as an extract in the course of the process as hereinafter described, separates on stratification into an aqueous upper layer containing 4.7% of epichlorohydrin, 1.6% dichlorohydrin, 5.8% monochlorohydrin and 0.8% sodium chloride, and an organic lower layer corresponding to about 3.22% by weight of the mixture. The lower layer which contains 1.3% water, 25% epichlorohydrin, 19.9% dichlorohydrin, 1.7% monochlorohydrin and 52.1% of trichloropropane, tetrachloropropyl ether and other impurities extracted therewith from the aqueous phase is taken off with about five times its weight of the aqueous phase and heated with steam injected at 225 pounds pressure for about six minutes total residence time at 320° F. to hydrate the epichlorohydrin content. The hydration mixture was cooled at 250° F. and on stratification gives an upper aqueous phase containing 13.2% monochlorohydrin, 2.2% dichlorohydrin, 0.6% sodium chloride and 0.2% trichloropropane and tetrachloropropyl ether, and a lower organic phase corresponding to about 10.5% of the total mixture. The upper aqueous phase is separated and added to the upper layer containing 4.7% epichlorohydrin and chlorohydrins previously separated and the mixture is hydrolyzed with sodium carbonate at about 325° F. under 135 p. s. i. g. to produce a dilute (about 7%) glycerine solution.

The lower organic phase from this second phase separation containing 1.7% water, 1.7% epichlorohydrin, 19.5% dichlorohydrin, 5.2% monochlorohydrin and 71.9% trichloropropane, tetrachloropropyl ether and other impurities is extracted with water by countercurrent flow in a rotary disc contactor operated at a temperature of about 90° F. using about 8 gallons of water per gallon of organic phase fed. The extract containing 0.7% monochlorohydrin, 2.6% dichlorohydrin, 0.1% glycerine, 0.2% tetrachloropropyl ether and trichloropropane, and 96.4% water is returned to the feed to the system to provide dilution water and the raffinate phase containing 94.7% trichloropropane, tetrachloropropyl ether and impurities extracted thereby, 1.4% dichlorohydrin, 1.2% epichlorohydrin and 2.7% water is removed from the system. The loss of glycerine precursors in this stream is only about 0.2% of the glycerine production.

The finished glycerine obtained after concentration and recovery in the usual way has the following analyses:

| | |
|---|---|
| Specific gravity 60/60° F | 1.2651 |
| Glycerine, percent by weight | 99.81 |
| Water, percent by weight | 0.15 |
| Color (Hazen equivalent) | 5 |
| Color (USP XIII) | Pass |
| Chloride (USP XIII) | Pass |
| Acrolein, glucose and ammonia (USP XV) | Pass |
| Readily carbonizable substances (USP XV) | Pass |
| RCS Ratio (values above 1.0 correspond to RCS–USP XV fail) | 0.6 |

The same chlorohydrins processed in the same way but without separation of an organic phase from the feed to the hydrolyzer gave glycerine which had a color ranging from 10–15 (Hazen equivalent) and failed the USP test for readily carbonizable substances, showing an RCS ratio of about 1.5. It will be seen that unlike the glycerine produced according to the invention this glycerine does not meet the requirements for USP glycerine.

*Example II*

This example illustrates the production of USP glycerine from the same mixture of dichlorohydrins and epichlorohydrin employed in the preceeding example but using distillation of the lower layer in the recovery of glycerine precursors therefrom prior to extraction. In this modification of the process, the chlorohydrin feed is diluted, stratified and separated into an aqueous chlorohydrin-containing upper layer and an organic lower as described in Example I.

The lower layer is distilled with a portion of the aqueous upper layer at a temperature of 245° F. at 100 mm. Hg to take off overhead a fraction representing 28% of the total feed to the distillation column and having the following composition: 78.2% epichlorohydrin, 6.4% water, 8.1% trichloropropane, and 7.3% light ends. The bottoms product containing 0.7% epichlorohydrin, 29.1% mono- and dichlorohydrins, 70.2% trichloropropane, tetrachloropropyl ether and higher boiling components, and 0.0% water is extracted with water in a rotary disc contactor under the conditions of extraction used in Example I. The extract having the following composition added to the distillate and the aqueous phase from the phase separation step and the mixture hydrolyzed as described in Example I to glycerine: 94.0% water, 0.1% epichlorohydrin, 0.9% trichloropropane and tetrachloropropyl ether, and 5.0% dichlorohydrin and monochlorohydrin. The raffinate composed of 94.8% trichloropropane and tetrachloropropyl ether, 4.1% dichlorohydrin, 0.7% epichlorohydrin and 0.4% water is removed from the system and represents a loss of potential glycerine of only 0.5%.

The glycerine obtained is USP glycerine having the following properties:

| | |
|---|---|
| Specific gravity 60/60° F | 1.2650 |
| Glycerine, percent by weight | 99.8 |
| Water, percent by weight | 0.17 |
| Color (Hazen equivalent) | 5 |
| RCS Ratio | 0.6 |

It will thus be seen that the new process of the invention can be carried out in various ways to produce USP glycerine with negligible loss of valuable product in the process. Still other variations can be made in the process. Thus the invention is not limited to the details of operation disclosed by way of illustration nor is it to be restricted by any theory proposed in explanation of the improved results which are obtained.

I claim as my invention:

1. In a process for producing glycerine by hydrolysis of a trichloropropane-containing aqueous chlorohydrin feed, the improvement which comprises adjusting the water content of said aqueous feed so that the concentration of chlorohydrins in the mixture is between about 5% and about 15% by weight and an aqueous phase containing the major portion of the chlorohydrin content and a denser phase comprising the trichloropropane content and remainder of the chlorohydrin, separating said phases, removing a portion of the chlorohydrin content from the separated denser phase, then extracting said denser phase with water, removing said denser phase from the system after said extraction, and hydrolyzing the recovered chlorohydrin and the chlorohydrin content of said separated aqueous phase.

2. In a process for producing glycerine by hydrolysis of a mixture of epichlorohydrin and mono- and dichlorohydrins, the improvement which comprises adding aqueous mono- and diochlorohydrin solution to the epichlorohydrin to form a mixture containing between about 5% and about 15% by weight of said chlorohydrins, separating the mixture into an aqueous phase containing the major portion of the chlorohydrin content and a denser organic phase containing the remainder of the chlorohydrin content together with less water-soluble components present, subjecting the separated denser organic phase to epichlorohydrin hydration conditions to convert the major portion of the epichlorohydrin therein to monochlorohydrin, thereafter extracting the organic phase with water, removing said organic phase from the system after said extraction and hydrolyzing the thus separated chlorohydrins to produce glycerine.

3. A process in accordance with claim 2 wherein said hydration of the epichlorohydrin is carried out by heating said denser organic phase with a portion of the said aqueous chlorohydrin phase from which it had been separated.

4. A process in accordance with claim 3 wherein the hydration product is separated into an aqueous chlorohydrin phase and a denser organic phase and this aqueous chlorohydrin phase is added to the first separated aqueous phase containing the major portion of the chlorohydrin for hydrolysis therewith.

5. In a process for producing glycerine from allyl chloride chlorohydrination products by dehydrochlorination of a part thereof to epichlorohydrin and hydrolysis of epichlorohydrin thus produced together with the remaining aqueous solution of chlorohydrination products, the improvement which comprises separating from a mixture of said epichlorohydrin and said aqueous solution of chlorohydrination products wherein the concentration of chlorohydrins is between about 5% and about 15% by weight, trichloropropane and tetrachloropropyl ether in admixture with a minor portion of the chlorohydrins, heating the separated trichloropropane and tetrachloropropyl ether-containing mixture with water to hydrate epichlorohydrin therein to monochlorohydrin, stratifying the hydration product to separate an aqueous chlorohydrin solution from a denser organic phase, extracting the separated denser organic phase with water to remove chlorohydrin therefrom, removing said organic phase from the system after said extraction, and hydrolyzing thus separated aqueous chlorohydrins to form glycerine.

6. In a process for producing glycerine from an aqueous mixture of epichlorohydrin and dichlorohydrin isomers of about 5% to about 15% chlorohydrins content by weight containing minor amounts of trichloropropane and tetrachloropropyl ether, the improvement which comprises stratifying the mixture to separate an organic phase containing the trichloropropane and tetrachloropropyl ether with a minor portion of said chlorohydrins, distilling said organic phase to remove therefrom at least 95% of the epichlorohydrin content, removing the remainder of said organic phase from the system, combining the distillate with the major portion of the aqueous chlorohydrins from which said organic phase was separated, hydrolyzing the mixture to form glycerine, extracting the distillation residue with water to extract chlorohydrins therefrom and returning the extracted chlorohydrins to the process.

References Cited in the file of this patent

UNITED STATES PATENTS

| | | |
|---|---|---|
| 2,605,293 | Tymstra | July 29, 1952 |
| 2,714,123 | Johnson | July 26, 1955 |

FOREIGN PATENTS

| | | |
|---|---|---|
| 569,716 | Great Britain | June 6, 1945 |
| 570,374 | Great Britain | July 4, 1945 |

OTHER REFERENCES

Williams et al.: Chemical and Metallurgical Engineering, December 1940; pp. 834–8.

Miner et al.: "Glycerol," Reinhold, N. Y., 1953; pp. 83, 352–6, 370.